United States Patent
Chou

[11] Patent Number: 5,193,955
[45] Date of Patent: Mar. 16, 1993

[54] BINDING DEVICE FOR CARGOS

[76] Inventor: An-Chuan Chou, No. 212, Yung An Street, Tainan, Taiwan

[21] Appl. No.: 803,423

[22] Filed: Dec. 6, 1991

[51] Int. Cl.⁵ .............................................. B65B 11/00
[52] U.S. Cl. ..................................... 410/100; 410/97; 24/193; 24/68 CD
[58] Field of Search ...................... 410/96, 97, 98, 99, 410/100, 101, 102, 103; 24/68 CD, 134 R, 170, 191, 193

[56] References Cited

U.S. PATENT DOCUMENTS

| | | | |
|---|---|---|---|
| 2,372,967 | 4/1945 | Martin | 410/97 |
| 2,455,237 | 11/1948 | Davis | 410/97 |
| 3,173,539 | 3/1965 | Looker | 410/97 |
| 3,312,181 | 4/1967 | Davidson | 410/97 |
| 3,961,585 | 6/1976 | Brewer | 410/97 |
| 4,257,644 | 3/1981 | Stephens | 410/96 X |
| 4,842,458 | 6/1989 | Carpenter | 410/103 X |

Primary Examiner—Michael S. Huppert
Assistant Examiner—James T. Eller, Jr.
Attorney, Agent, or Firm—Morton J. Rosenberg; David I. Klein

[57] ABSTRACT

A cargo binding device includes a net member, a plurality of intermediate cargo strap members, and a plurality of strap tensioners. The net member is formed of a plurality of longitudinally and transversely extending and intersecting cargo straps whose intersection areas are secured each to the other. Each end portion of the individual longitudinally and transversely extending cargo straps of the net member is formed into a loop. Each strap tensioner includes a spring-loaded push plate member. The push plate member is provided with a plurality of teeth for grippingly engaging an intermediate cargo strap members.

1 Claim, 4 Drawing Sheets

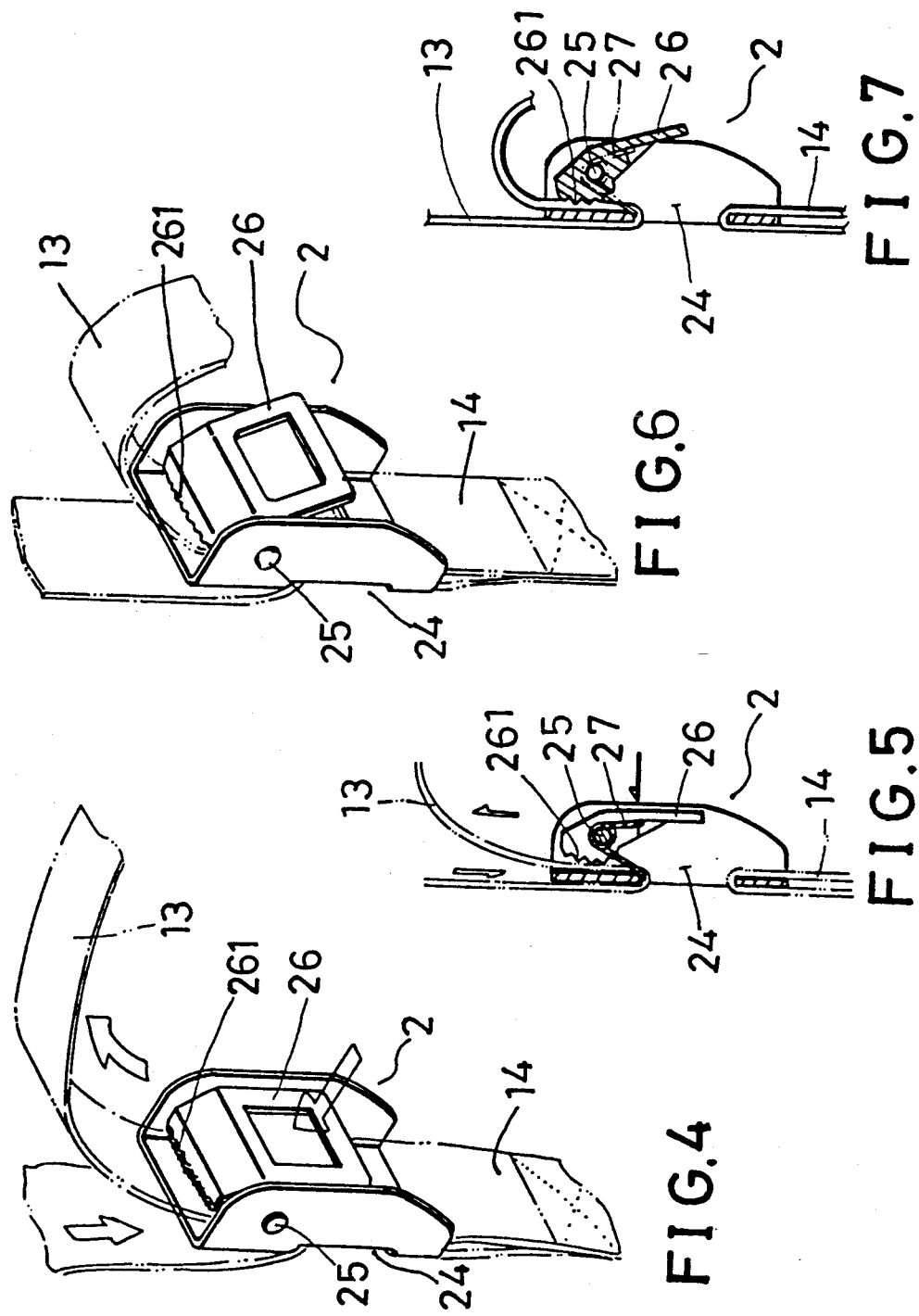

BINDING DEVICE FOR CARGOS

BACKGROUND OF THE INVENTION

1. Field of the Invention

This invention relates to a binding device for cargo or freight, and more particularly to a device having a plurality of longitudinally and transversely extending intersecting cargo straps that are secured each to the other to form a net member for securing cargo to a carrier and for stabilizing a cargo during transportation.

2. Description of the Prior Art

Industrial development has led to a plurality of diverse and novel products that are reaching the consumer market. Transportation and related concerns of such products have become very important. Generally speaking, most cargo binding devices still use individual cargo straps and strap tensioners requiring considerable time and effort to secure a particular load. Conventionally, individual cargo straps are secured to a load one after another. For example, fastening known binding devices to a cargo includes: (1) securing a first end of a cargo strap to a hook which is attached to a first side of the carrier; (2) throwing the second end of the cargo strap over the cargo; (3) passing the second end of the cargo strap through a hook attached to a second side of the carrier; and, (4) securing the second end of a cargo strap to the second side of the carrier by tieing or the use of a strap tensioner. A considerable amount of time is wasted when repeating the preceding steps to fasten a plurality of cargo straps to cargo. Furthermore, known binding devices become loose through vibration when the carrier is driven over rugged roads or at high speeds.

There still remains a need for a cargo binding device capable of firmly fastening cargos in all directions with a minimum amount of effort in a short period of time, and capable of maintaining the stability of the cargo during transport.

SUMMARY OF THE INVENTION

The primary object of the invention is to provide a cargo binding device consisting of a net member formed by a plurality of longitudinally and transversely extending and intersecting cargo straps, a plurality of intermediate cargo strap members, and a plurality of strap securing means for lengthening, shortening, and releasably securing the intermediate cargo strap members. The cargo binding device is capable of firmly securing cargos on a carrier in all directions and maintaining stability of the secured load.

Accordingly, the preferred embodiment of the present invention has the following advantages:

1. The binding device of the present invention includes a net member formed of a plurality of longitudinally and transversely extending and intersecting cargo straps, a plurality of intermediate cargo strap members, and a plurality of strap securing means. The net member, the intermediate cargo strap members, and the strap securing means are manufactured separately, but are capable of being assembled and secured together in a short period of time with a minimum amount of effort.

2. The strap securing means of the present invention are disposed at each end of the individual straps of the net member so that the cargo binding device of the present invention is capable of securely fastening cargo in all directions to stabilize the cargo and to increase the durability of the cargo binding device.

BRIEF DESCRIPTION OF THE DRAWINGS

The invention will be better understood by reference to the accompanying Drawings, wherein:

FIG. 4 is a perspective view showing a cargo strap movable in the strap tensioner of the present invention;

FIG. 5 is a side cross-sectional view showing a cargo strap movable in the strap tensioner of the present invention;

FIG. 6 is a perspective view showing the cargo strap fastening of strap tensioner of the present invention; and, FIG. 7 is a side cross-sectional view showing the cargo strap fastening of strap tensioner of the present invention.

DESCRIPTION OF THE PREFERRED EMBODIMENT

Figure 1:
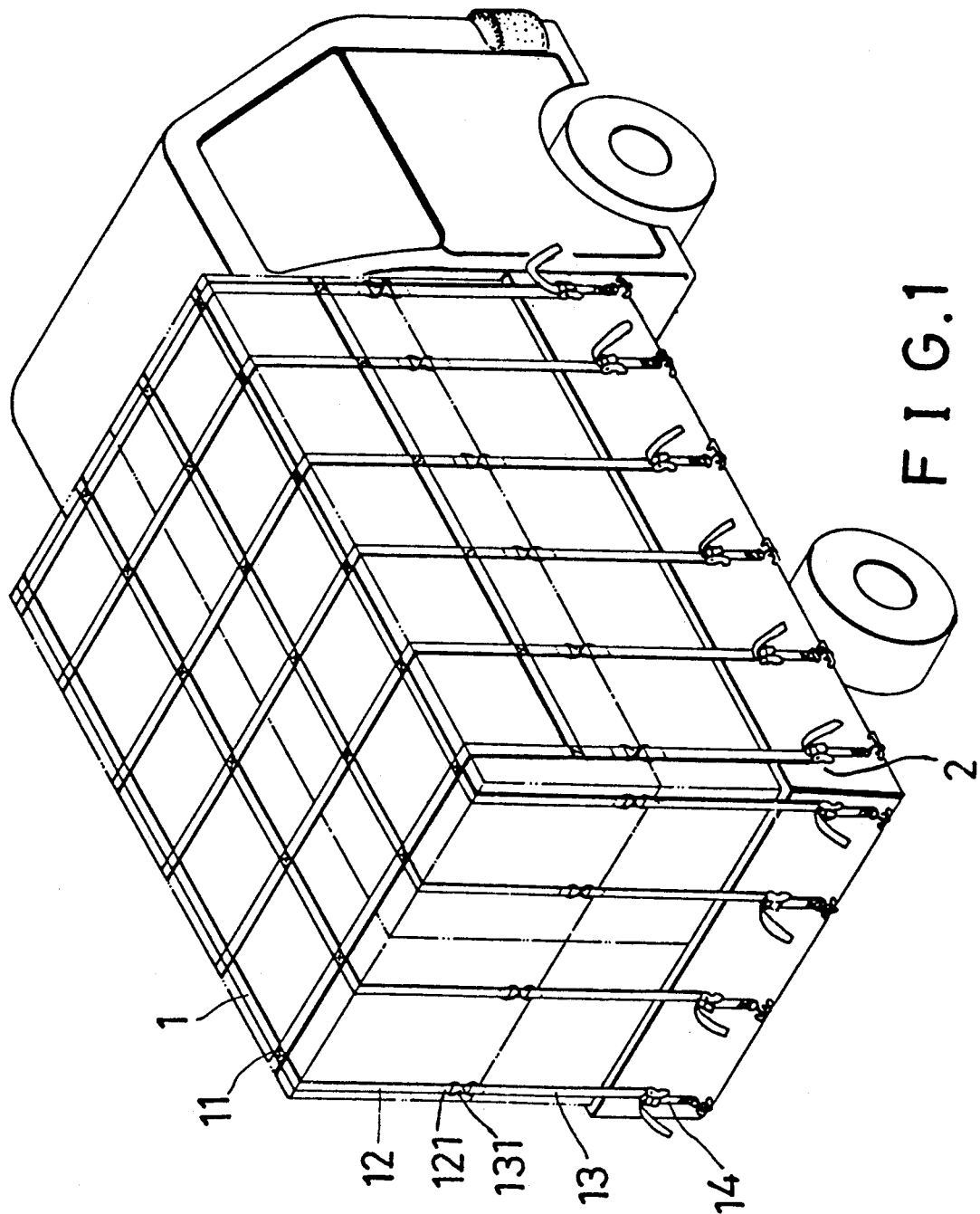
FIG. 1 is a schematic view showing a preferred embodiment of the present invention.

As shown in FIG. 1, the present invention is directed to a cargo binding device including a net member 1, a plurality of intermediate cargo strap members 13, and a plurality of strap securing means 3.

Figure 2:
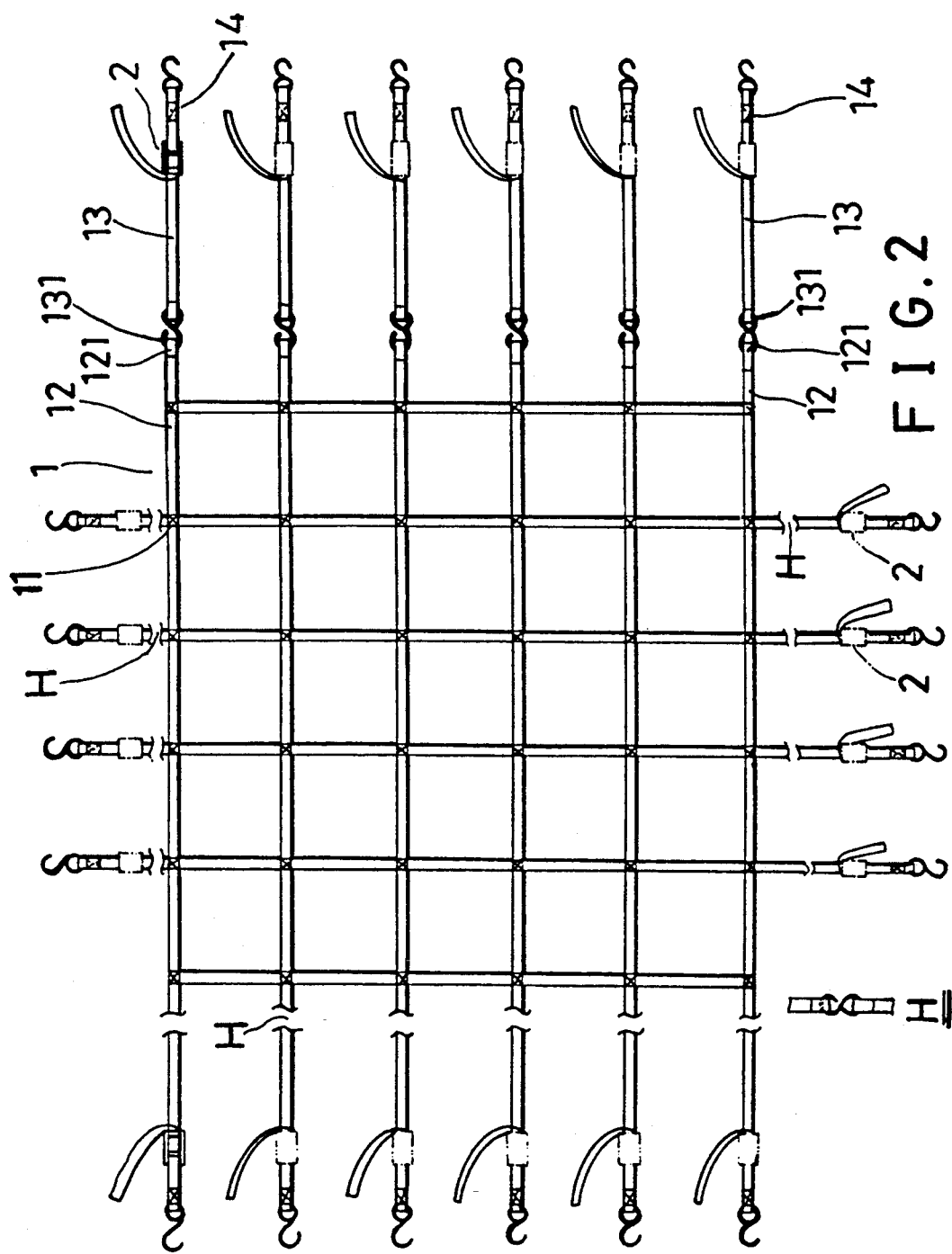
FIG. 2 is a plan view showing the cargo binding device of the present invention whose cargo straps and strap securing means are in assembled condition.

The net member 1 is formed by a plurality of longitudinally and transversely extending and intersecting cargo straps 12 secured each to the other at their intersections 11. Moreover, each end portion of the individual longitudinally and transversely extending cargo straps 12 is folded back on itself and secured thereto to form a loop 121, as shown in FIGS. 1 and 2.

The intermediate strap member 13 is formed of a strap having a first end folded back on itself and secured thereto to form a loop 133, and a hook member 131 secured to the loop 133. The second end of the intermediate cargo strap member 13 is grippingly and releasably received by the strap securing means 3. The loop 121 of the cargo strap 12 releasably receives the upper end of the hook 131 of the intermediate cargo strap member 13.

Figure 3:
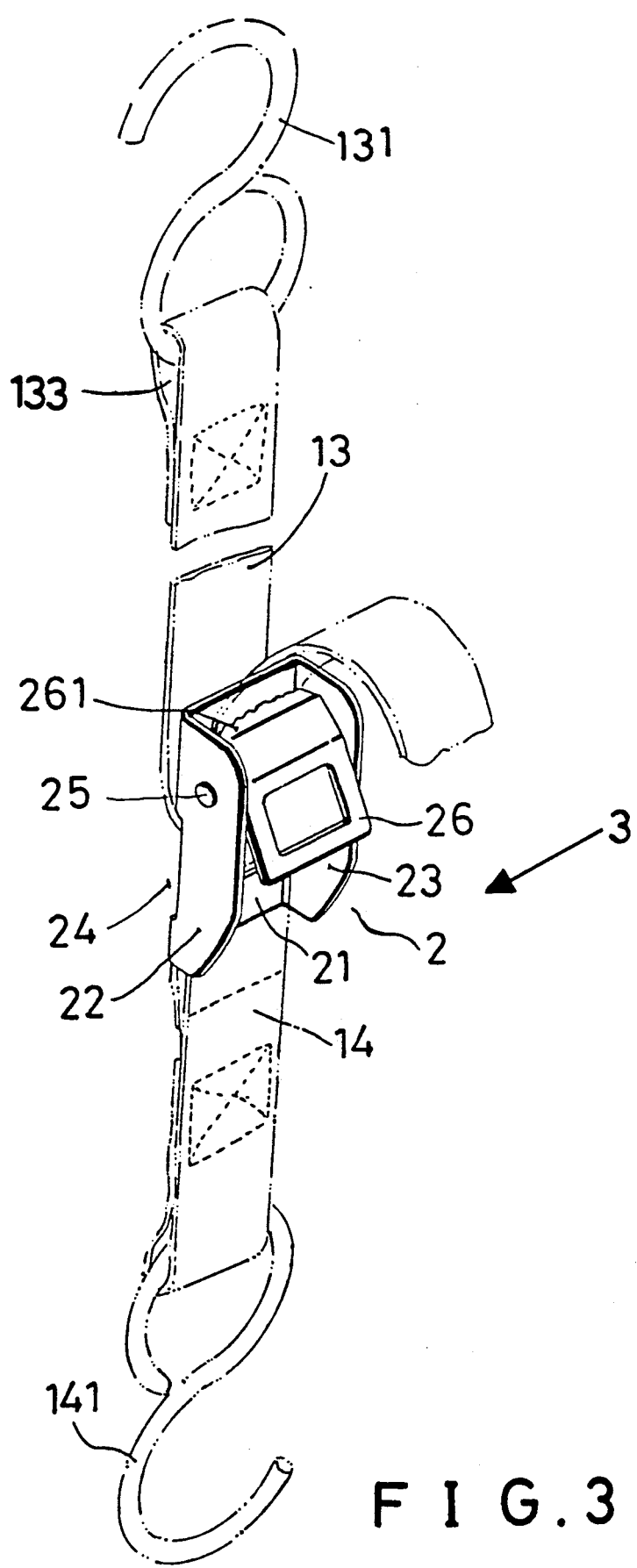
FIG. 3 is a schematic view showing the detailed structure of the strap tensioner of the present invention.

The strap securing means 3 includes a strap tensioner 2 having a base 21 and two spaced walls 22 and 23 extending upwardly from opposed edges of the base 21, and an anchoring strap 14, as shown in FIGS. 3, 4 and 6. An aperture 24 is disposed in the base 21. A fixed shaft 25 extends between and through the upper end portions of the walls 22 and 23. Pivotally mounted on the shaft 25 is a push plate member 26 and a spring 27, as shown in FIGS. 5 and 7. The spring loaded push plate member 26 is provided with a plurality of teeth 261 disposed on its upper surface. The second end of the intermediate strap member 13 is inserted through the aperture 24 and passed between the base 21 and the plurality of teeth 261. The second end of the intermediate cargo strap member 13 is engaged by the plurality of teeth 261, thereby firmly securing the strap 13, as shown in FIGS. 3 and 7.

The anchoring strap 14 has a first end inserted through the aperture 24 of the base 21 and folded back on itself and secured thereto to form a first loop, and a second end folded back on itself and secured thereto to form a second loop. A hook member 141 is secured to the second loop of the anchoring strap 14. The hook member 141 of the anchoring strap 14 attaches to a corresponding hook member of the carrier.

In operation, the net member 1 is placed over the cargo on a carrier. Each end portion of the individual longitudinally and transversely extending cargo straps 12 of the net member 1 is secured to a strap tensioner 2 through a corresponding intermediate cargo strap member 13 by inserting a hook member 131 of the intermediate cargo strap member 13 into the loop 121 of the cargo strap 12, as shown in FIGS. 1 and 2. The free end of the intermediate cargo strap 13 is inserted through aperture 24 of the base 21 of the strap tensioner 2. The hook member 141 of the anchoring strap 14 is secured to a corresponding hook member on the carrier. The spring loaded push plate member 26 is pushed downwardly to allow the intermediate cargo strap member 13 to be passed between the base 21 and the plurality of teeth 261 of the push plate member 26. The effective lengths of the intermediate cargo strap member 13 and the cargo strap 12 can be decreased by pulling on the second end of the intermediate cargo strap member 13, thereby placing the cargo strap 12 and intermediate cargo strap member 13 under tension. When the push plate member 26 is released, the plurality of teeth 261 bite into the intermediate cargo strap member 13, as shown in FIGS. 6 and 7. The preceding steps are repeated for each corresponding cargo strap 12 until the cargo is firmly secured on the carrier, as shown in FIG. 1.

To release the intermediate cargo strap member 13 from the strap tensioner 2, the spring-loaded push plate member 26 is pushed downwardly to remove the plurality of teeth 261 from the intermediate cargo strap member 13, thereby allowing the intermediate cargo strap member 13 to be easily pulled from the strap tensioner 2.

While the preferred embodiments of the invention have been described above, it will be recognized and understood that various modifications may be made therein and appended Claims are intended to cover all such modifications which may fall within the spirit and scope of the invention.

What is claimed is:

1. A cargo binding device comprising:

a net member, said net member formed by a plurality of longitudinally and transversely extending intersecting cargo straps secured to each other at intersecting areas thereof, each end portion of said longitudinally and transversely extending cargo straps being formed into a loop;

a plurality of intermediate cargo strap members, each of said intermediate cargo strap members associated with one of said plurality of said longitudinally or transversely extending cargo straps, each of said intermediate cargo strap members including a first end formed into a loop and a free second end, and a hook member fixedly attached to said loop formed on said first end of said intermediate cargo strap member;

a plurality of strap securing means for lengthening, shortening, and releasably securing said intermediate cargo strap members, each of said strap securing means associated with one of said plurality of said intermediate cargo strap members, each of said strap securing means including a strap tensioner having a base member, two spaced walls extending upwardly from opposed edges of said base member, a shaft disposed between said two spaced walls, and a spring loaded push plate member rotatably mounted on said shaft, said push plate having a front surface with a plurality of teeth provided on a front surface thereon, and an anchoring strap having a first end secured to said strap tensioner and a second end formed into a loop, and a hook member secured to said loop formed on said second end of said anchoring strap, wherein a hook member of each of said intermediate cargo strap member is releasably secured to said loop formed on each of said longitudinally and transversely extending cargo straps, said second free end of each of said intermediate cargo strap members is grippingly and releasably secured to a strap tensioner of each of said cargo strap securing means, and said hook member of each said anchoring strap is releasably secured to a carrier.

* * * * *